Figure 1:
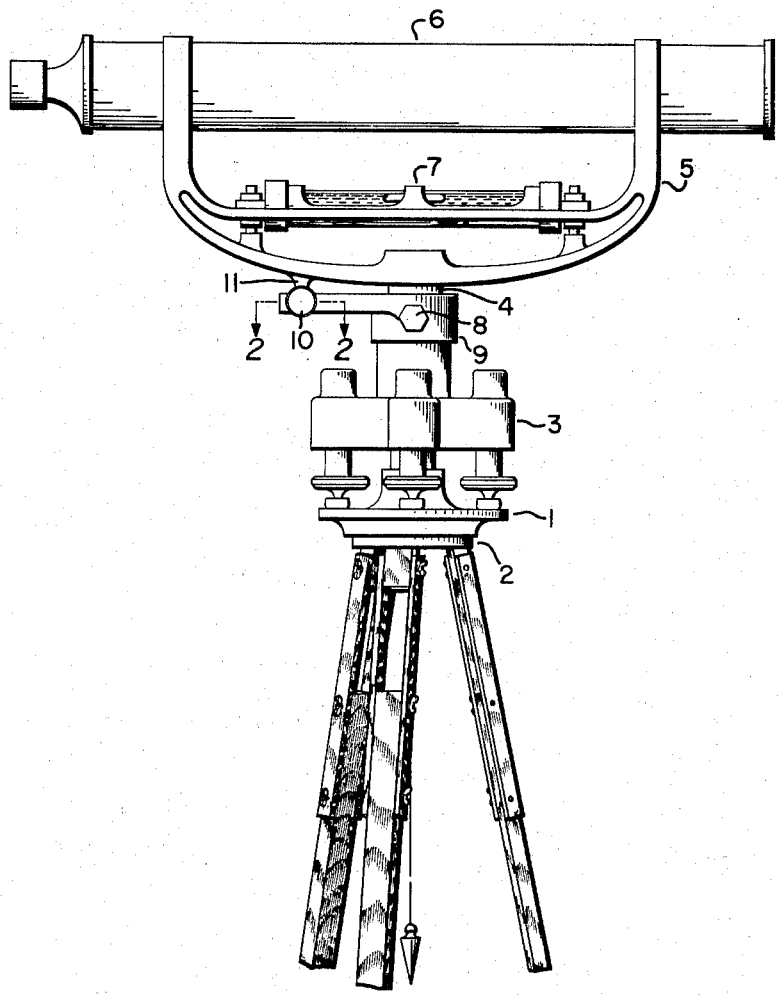

Feb. 17, 1959 M. J. FLYNN 2,873,530
TANGENT ADJUSTMENT FOR DUMPY LEVELS AND THE LIKE
Filed Oct. 17, 1955 2 Sheets-Sheet 1

INVENTOR.
Maurice J. Flynn
BY Lippincott and Smith
Attorneys

Feb. 17, 1959  M. J. FLYNN  2,873,530
TANGENT ADJUSTMENT FOR DUMPY LEVELS AND THE LIKE
Filed Oct. 17, 1955  2 Sheets-Sheet 2

INVENTOR.
Maurice J. Flynn

BY *Lippincott and Smith*

Attorneys

United States Patent Office 2,873,530
Patented Feb. 17, 1959

2,873,530

TANGENT ADJUSTMENT FOR DUMPY LEVELS AND THE LIKE

Maurice J. Flynn, San Francisco, Calif.

Application October 17, 1955, Serial No. 540,848

2 Claims. (Cl. 33—46)

This invention relates to mechanical adjusting devices, and in particular, to an improved tangent adjustment for engineers' dumpy levels and the like.

Engineers' dumpy levels and other surveying instruments have a tangent adjustment which generally comprises a precision adjustment screw and nut for adjusting the relative horizontal angular positions of a clamp and a rotative table of the instrument. To permit rapid and precise adjustments the tangent adjusting screw must operate smoothly and easily at all times and there must be no appreciable looseness of play between the screw and the nut. Heretofore precision screws and lapped nuts have generally been employed, but even this relatively expensive adjusting device has proved somewhat unsatisfactory because of inevitable wear. Accordingly, an object of this invention is to provide a tangent adjustment that is wear-resistant, that operates smoothly and easily at all times, that maintains a close fit between the screw and the "nut" throughout the life of the instrument and that is inexpensive to manufacture. Other objects and advantages will appear as the description proceeds.

Briefly stated, in accordance with one aspect of this invention and engineer's dumpy level or the like has a tangent adjustment comprising a clamp having a horizontal cylindrical hole with a shoulder therein. A hollow cylindrical gasket, preferably made of deformable woven yarn, is fitted into this hole and abuts against the shoulder. The outer end of the hole is internally threaded to receive an externally threaded hollow compression nut that abuts against the other end of the gasket. A tangent adjusting screw extends through the hollow nut and through the hollow cylindrical gasket, and abuts against a tab attached to the rotative table of the instrument. The tab is held against the end of the transit adjusting screw by a spring-biased plunger pressing against its other side.

The deformable gasket is compressed between the shoulder and the compression nut that abut against opposite ends of the gasket. This compression deforms the gasket and causes its inner surface to conform substantially to the shape of the threaded adjusting screw. Consequently the gasket forms a precision "nut" for the adjusting screw and the fit between the screw and the gasket can be made as close as desired simply by tightening the nut to apply increased compressive force to the gasket. This arrangement provides an adjusting device that operates easily and smoothly at all times and one that is exceptionally wear-resistant. Any wear that may occur can quickly and easily be compensated by tightening the compression nut to apply additional compressive force to the gasket.

Figure 3:
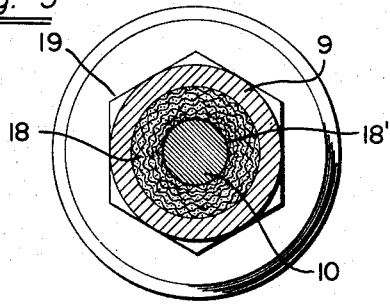
Figure 4:
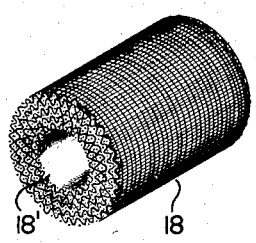

The invention will be better understood from the following description taken in connection with the accompanying drawings, and its scope will be pointed out in the appended claims. In the drawings, Fig. 1 is a side elevation of an engineer's dumpy level having a tangent adjustment embodying principles of this invention, Fig. 2 is a fragmentary section of the tangent adjustment taken generally along the line 2—2 of Fig. 1, Fig. 3 is a section taken along the line 3—3 of Fig. 2, and Fig. 4 is a perspective view of the deformable gasket.

Referring to the drawings, an engineer's dumpy level comprises a leveling plate 1 that is attached to and is supported in an approximately horizontal position by a conventional tripod 2. A star piece 3 supports a vertical spindle 4 attached to a rotative table 5 upon which a conventional telescope 6 and a spirit level 7 are mounted. Table 5, together with telescope 6 and spirit level 7, may be rotated in the horizontal plane and may be secured in any desired azimuth position by tightening the set screw 8 of a horizontal clamp 9. Fine adjustments in the azimuth angle may be made by adjusting a tangent adjusting screw 10. The present invention is concerned with improvements in the tangent adjusting means, which will now be described.

Figure 2:
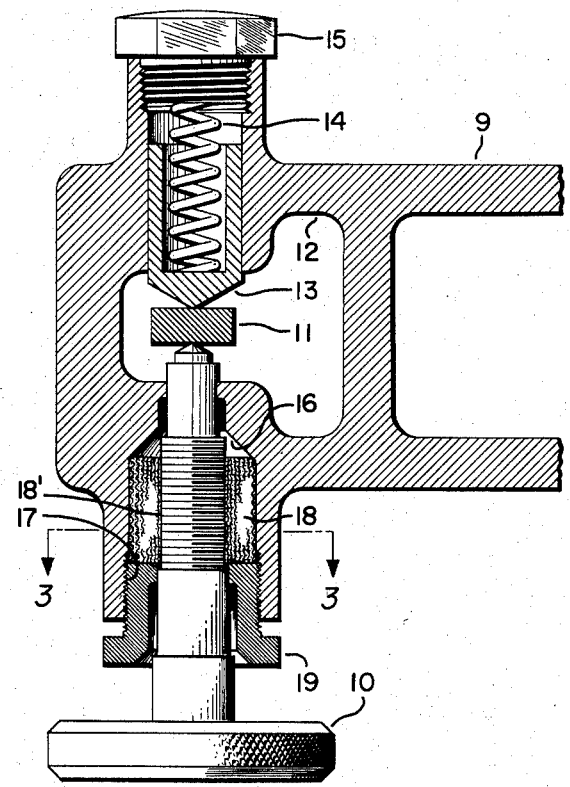

Table 5 has a vertical tab 11 that extends downward into a vertical aperture 12 of the horizontal clamp 9, as is best shown in Fig. 2. On one side of clamp 9 there is a horizontal cylindrical hole containing a plunger 13 that is pressed against tab 11 by a spring 14 held in place by a spring cap 15, as shown. On the opposite side of clamp 9 there is another substantially cylindrical hole, axially alined with the first hole, that contains a shoulder 16 and has an interiorly threaded end portion 17. Fitting inside this second hole and abutting against the shoulder 16 there is a deformable cylindrical gasket 18.

A hollow tension nut 19 is exteriorly threaded to mate with the internally threaded end 17 of the horizontal hole. The tangent adjusting screw 10 extends through hollow nut 19, through the hollow center portion of cylindrical gasket 18 and abuts against the side of tab 11 opposite plunger 13. Spring 14 and plunger 13 keep tab 11 always in contact with the end of screw 10 so that fine adjustments in the azimuth direction of the telescope can be made by moving the tangent adjusting screw 10 inward and outward with respect to claim 9.

The cylindrical gasket 18 preferably is made of braided asbestos yarn impregnated with a suitable lubricant such as graphite, lead or molybdenum sulphide. A gasket made in this manner has exceptionally good wear resisting and lubricating properties, and at the same time is sufficiently deformable for purposes of this invention.

The compression nut 19 is tightened so that the nut 19 and the shoulder 16 apply compressive force to opposite ends of gasket 18. This compressive force deforms the gasket and causes its cylindrical inner surface 18' to engage and generally conform in shape to the threaded surface of adjusting screw 10. Now the gasket 18 is, in effect, a nut and when adjusting screw 10 is turned the engagement between the threads of the screw and the threads formed on the inner surface 18' of the gasket by its engagement with the screw cause the screw to move in and out in the same manner as if gasket 18 were a metal nut. However, the gasket threads exactly fit the screw threads and thus a high-precision fit between the screw and the screw is obtained at small expense. Furthermore, the lubricating qualities of the gasket combined with the precision fit of the threads provide an adjusting action that is smooth and easy at all times so that the finest adjustments can be made with relative ease. The arrangement is very wear-resistant and whenever wear does occur, it can be compensated quickly and easily merely by tightening nut 19 to apply additional compressive force to gasket 18. While particularly applicable to the tangent adjustment of dumpy levels and the like, principles of the invention may also be used in other adjusting devices.

It should be understood that this invention in its broader aspects is not limited to the specific embodiment herein illustrated and described, and that the following claims are intended to cover all changes and modifications that do not depart from the true spirit and scope of the invention.

What is claimed is:

1. An adjusting device comprising a member having a cylindrical hole with a shoulder therein, an end of said hole opposite said shoulder being internally threaded, a hollow cylindrical gasket of deformable material fitted into said hole and abutting against said shoulder, a hollow externally threaded compression nut mating with said threaded end of said hole and abutting against said gasket, and an externally threaded screw extending through said hollow nut and said hollow gasket, said deformable gasket being compressed between said shoulder and said nut so that it engages the threads of said screw and forms a nut therefor, said gasket being the only part in mating engagement with the threads of said screw, so that the engagement of said gasket with the screw thread solely produces and controls a longitudinal movement upon rotation of said screw relative to said gasket.

2. A tangent adjustment for dumpy levels and the like, comprising a horizontal clamp having a vertical aperture, a rotative horizontal table having a vertical tab extending into said aperture, said clamp having first and second alined horizontal holes opening into opposite sides of said aperture, a plunger fitting in said first hole, a spring pushing said plunger against one side of said tab, a screw extending through said second hole and abutting against the other side of said tab, a deformable cylindrical gasket within said second hole and encircling said screw and means for compressing said gasket to form a nut for said screw.

References Cited in the file of this patent

UNITED STATES PATENTS

| | | |
|---|---|---|
| 552,751 | Denison | Jan. 7, 1896 |
| 1,686,063 | Benbow | Oct. 2, 1928 |
| 1,777,853 | Mahler | Oct. 7, 1930 |
| 2,134,324 | Brackett | Oct. 25, 1938 |
| 2,280,886 | Brace | Apr. 28, 1942 |
| 2,702,393 | Merton | Feb. 22, 1955 |

FOREIGN PATENTS

| | | |
|---|---|---|
| 203 | Great Britain | A. D. 1881 |